United States Patent [19]

Griffith et al.

[11] 4,284,747
[45] Aug. 18, 1981

[54] CIS-TRANS FLUOROPOLYOL POLYACRYLATE

[75] Inventors: James R. Griffith, Riverdale Heights; Jacques G. O'Rear, Temple Hills, both of Md.

[73] Assignee: The United States of America as represented by the Secretary of the Navy, Washington, D.C.

[21] Appl. No.: 124,203

[22] Filed: Feb. 25, 1980

Related U.S. Application Data

[63] Continuation of Ser. No. 962,856, Nov. 22, 1978, abandoned.

[51] Int. Cl.$^3$ .............................................. C08L 63/00
[52] U.S. Cl. .................................... 525/530; 525/531; 525/922
[58] Field of Search ............................... 525/530, 531

[56] References Cited

U.S. PATENT DOCUMENTS

| | | | |
|---|---|---|---|
| 2,824,851 | 2/1958 | Hall .................. | 260/837 R |
| 3,256,226 | 6/1966 | Fekete ................ | 260/836 |
| 3,373,075 | 3/1968 | Fekete ................ | 260/837 R |
| 3,432,438 | 3/1969 | May ................... | 260/836 |
| 3,586,526 | 6/1971 | Aronoff ............... | 260/837 R |
| 3,586,527 | 6/1971 | Aronoff ............... | 260/837 R |
| 3,872,045 | 3/1975 | Field et al. .......... | 260/837 R |
| 4,132,681 | 1/1979 | Field et al. .......... | 260/836 |

*Primary Examiner*—Paul Lieberman
*Attorney, Agent, or Firm*—R. S. Sciascia; A. L. Branning; T. E. McDonnell

[57] ABSTRACT

A cis-trans fluoropolyol acrylate prepared by reacting acrylic acid anhydride with a fluoropolyol having the structural formula:

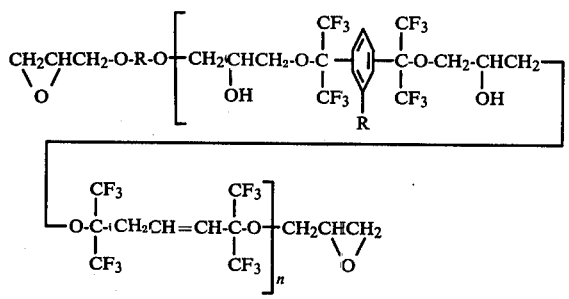

where R is selected from the group consisting of —C(CF$_3$)$_2$C$_6$H$_4$C(CF$_3$)$_2$— and —C(CF$_3$)$_2$CH$_2$CH=CH(CF$_3$)$_2$C—, R' is selected from the group consisting of —H and —(CF$_2$)$_x$F, x is 1 to 8 and n is any integer from 1 to 15, and the crosslinked thermosetting polymer prepared therefrom. The fluoropolyacrylate is useful in fabricating castings, coatings or adhesives.

11 Claims, No Drawings

CIS-TRANS FLUOROPOLYOL POLYACRYLATE

This is a continuation of application Ser. No. 962,856, filed Nov. 22, 1978 abandoned.

BACKGROUND OF THE INVENTION

The present invention pertains generally to hydrophobic polymers and in particular to fluorinated polyacrylates.

Polyacrylates have gained wide acceptance as coatings and adhesives. They are easy to use and have considerable strength; however, their resistance to water, solvents and dirt is not as great as that of fluoropolymers. Also fluoropolymers which are thermoplastic can be applied to extremely low-energy surfaces, whereas polyacrylates cannot be so applied. On the other hand, thermoplastic fluoropolymers have poor strength and durability, while polyacrylates have exceptional strength.

Due to the exceptional properties that each type of compound possesses, a highly fluorinated polyacrylate would be extremely useful. Attempts to synthesize fluorinated polyacrylates have, to date, been unsuccessful.

To begin with, few fluorinated polyols are known. The ones which are known do not readily react with acids.

SUMMARY OF THE INVENTION

It is therefore an object of the present invention to provide a highly fluorinated thermosetting compound.

Another object of this invention is to provide a hydrophobic polymer with an adhesive strength equaling that of nonfluorinated polyacrylates.

A further object of this invention is to provide a polymer with exceptional optical qualities.

These and other objects are achieved by reacting a cis-trans fluoropolyol in ester or ketone solvents, with a structural formula of

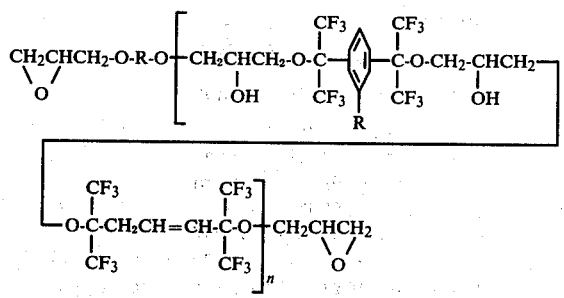

with acrylic acid anhydride in the presence of a quaternary ammonium salt. Adding a free radical catalyst or exposing the solution or the dry product to ultraviolet light results in solidification.

DETAILED DESCRIPTION OF THE INVENTION

The cis-trans fluoropolyol from which the fluoroacrylate is prepared can be synthesized by the method reported in Field, Donald E. *Fluorinated Polyepoxy and Polyurethane Coatings.* In J. Coating Tech. 48 (615): p. 43–47, 1976, and in U.S. Patent, App. Ser. No. 736,965, filed on Oct. 29, 1976 by Donald E. Field and James R. Griffith, now U.S. Pat. No. 4,132,681. According to that method, a cis-trans diol which is derived from hexafluoroacetone and propene is mixed with the fluoroaromatic diols: 1,3- and 1,4-bis(2-hydroxyhexafluoro-2-propyl) benzene in a mole ratio of 1:1. The mixture is reacted with epichlorohydrin in a diol-to-epichlorohydrin mole ratio of 1:1. The fluoroaromatic diol may have a perfluoroalkyl group substituent on the ring. Sodium hydroxide is added to neutralize the acid by-product. It is preferred that a 10 weight percent of NaOH in excess of the stoichiometric amount be used. The water-washed, dried product is a light amber solid of the following structure:

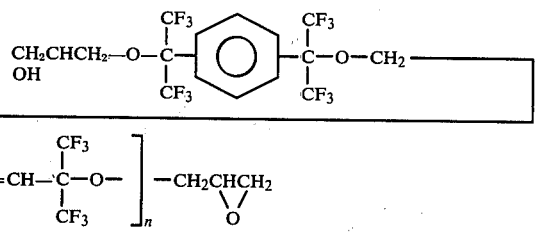

wherein R is selected from the group consisting of —C(CF$_3$)$_2$C$_6$H$_4$C(CF$_3$)$_2$— and —C(CF$_3$)$_2$CH$_2$CH=CH(CF$_3$)$_2$C—, R' is selected from the group consisting of —H and —(CF$_2$)$_x$F, x is an integer from 1 to 8, and n is from 1 to 15. The cis-trans fluoropolyol used in the practice of this invention is usually a mixture of polyols with different chain lengths. The average value of n is usually from 4 to 10.

The fluoroacrylate of the present invention is obtained from the above cis-trans fluoropolyol by esterifying, in solution, the polyol with acrylic acid anhydride. The solvent may be a ketone or ester. Examples of suitable solvents are acetone, β-ethoxyethlacetate, isobutyl ketone, and ethyl acetate. The catalyst must promote the esterification reaction and not the polymerization reaction. Unfortunately most catalysts promote both or the polymerization reaction. It has been discovered that a quaternary ammonium salt does promote the esterification reaction over the polymerization reaction. In particular, cetyltrimethylammonium bromide or chloride produces the best results.

The progress of the reaction is monitored by observing the disappearance of the infrared band at 1810 cm$^{-1}$ due to the anhydride function. After the reaction is complete, the solvent is removed by, for example, flash evaporation at a reduced pressure from 1 to 10 mm Hg and a temperature from 50°–60° C., leaving a viscous, light amber liquid. An optically clear ester is readily prepared by percolating an ether solution, e.g. a diethyl ether solution of the ester, through neutral alumina. Thereafter the solvent is removed. The formula for a completely esterfied product is believed to be:

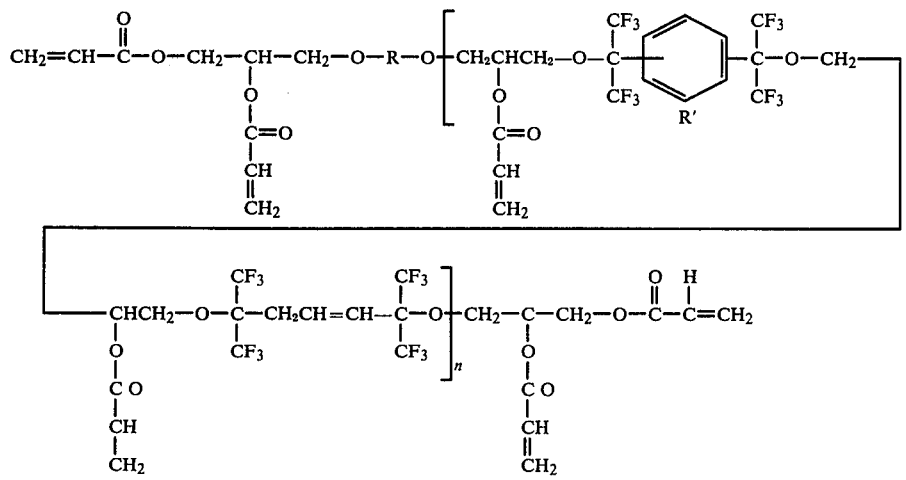

The esterification of the epoxy end groups proceeds in the following manner:

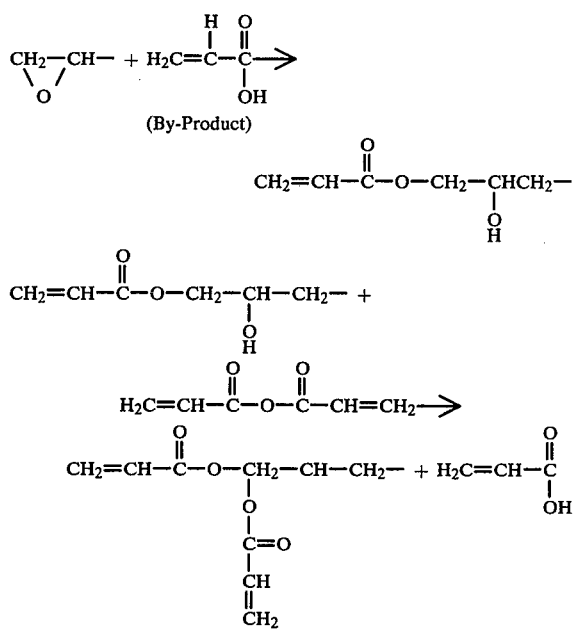

The degree of esterification depends on the amount of acrylic acid anhydride. Thus it is possible to select the degree of esterification of the acrylate. Since esterification provides sites for cross-linking, increasing the esterification causes the final product to be more rigid and less pliable. The product at an approximate 100 percent esterification is a tough rigid solid, whereas, at about 10 percent esterification the product is a very soft, self-healing, rubbery material. The fraction of partial esterification is determined by the ratio of the reacted acid anhydride to the quantity required for full esterification. For stoichiometric purposes, the equivalent weight of the cis-trans fluoropolyol can be regarded as approximately 450.

The crosslinking can be promoted by conventional free radical catalysts such as benzoylperoxide, or cumene hydroperoxide or alternatively by u.v. light. It is also possible to promote crosslinking with hard radiation, such as that from cobalt-60.

The following examples are given by way of illustration and are not meant to limit the scope of this disclosure or the claims to follow. Example I produces a one hundred percent esterification, while Example II produces a ten percent esterification.

EXAMPLE I

100% Esterification

An esterification charge was prepared by dissolving the cis-trans fluoropolyol with an average n-value of about 10 (105 g, 0.234 eq.) in 105 g of 20:20:60 vol. % of ethyl acetate, methylisobutyl ketone and Cellosolve Acetate, ($\beta$-ethoxyethylacetate) followed by the addition of acrylic anhydride (30 g, 0.238 eq.) and cetyltrimethylammonium bromide (1.2 g). The esterification was carried out in long-neck round-bottom flask equipped with a stopper, (to exclude moisture), magnetic stirrer and silicone bath (maintained at about 55° C.). Progress of the reaction was followed by observing the disappearance of the infrared band at 1810 cm$^{-1}$ due to the anhydride function. On this basis, the reaction was complete in 60 hours. Stripping solvents and traces of acrylic acid from this mixture for 3 to 4 hours at 45°–50° C. and 1.5 mm Hg left a residue (140 g) of a viscous light amber liquid. Infrared spectroscopy showed that this liquid was a fluoropolyol polyacrylate. An optically clear ester was readily prepared by decolorizing an ether solution of the former, precolating the latter through neutral alumina, and devolatilizing the effluent. Both products, the crude and the decolorized, were polymerized by the addition of benzoyl peroxide and by ultraviolet light.

EXAMPLE II

10% Esterification

A charge of the same 50 wt% of cis-trans fluoropolyol with an average n of 10 (210 g), acrylic anhydride (3.0 g) and a cetyltrimethylammonium bromide was esterified in a similar manner. A similar work-up leads to 100 g of a viscous strawcolored liquid ester. Decolorization and percolation techniques led to 90.1 g of almost water-white ester. Infrared spectroscopy was again used to monitor the progress of the reaction. This technique showed that all of the acrylic acid anhydride was reacted.

The strength and rigidity of the highly esterified polyacrylate (60% and higher) indicate that this material is an excellent structure material. The rubbery nature of the lightly esterified polyacrylate indicates that this material is an excellent sealant. Regardless of the amount of esterification, the polyacrylates of this invention have extremely high adhesive strength. Consequently, these polyacrylates are excellent adhesives and coatings.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A cis-trans fluoropolyol acrylate prepared from a fluoropolyol having the structural formula:

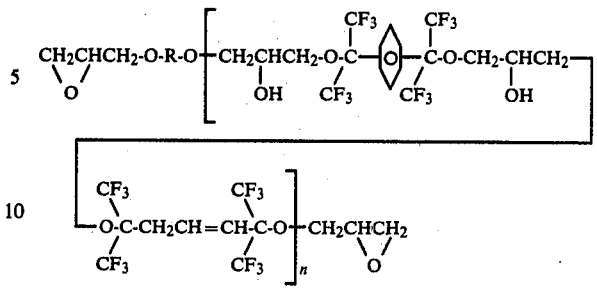

wherein R is selected from the group consisting of $-C(CF_3)_2C_6H_4C(CF_3)_2-$ and $-C(CF_3)_2CH_2CH=CH(CF_3)_2C-$, R' is selected from the group consisting of $-H$ and $-(CF_2)_xF$, n has an average value of 4 to 10, and x is from 0 to 8; said cis-trans fluoropolyol acrylate exhibiting at least 60 percent esterification based on the number of epoxy and secondary hydroxyl groups.

2. The acrylate of claim 1 wherein R is $-C(CF_3)_2C_6C_4C(CF_3)_2-$.

3. The acrylate of claim 1 wherein R is $-C(CF_3)CH_2CH=CH(CF_3)_2C-$.

4. The acrylate of claim 2 wherein R' is $-H$.

5. The acrylate of claim 3 wherein R' is $-H$.

6. A polyacrylate formed by polymerizing the acrylate of claim 1.

7. The polyacrylate of claim 6 wherein R is $-C(CF_3)_2C_6H_4C(CF_3)_2-$.

8. The polyacrylate of claim 6 wherein R is $-C(CF_3CH_2CH=CH(CF_3)_2C-$.

9. The polyacrylate of claim 7 wherein R' is $-H$.

10. The polyacrylate of claim 8 wherein R' is $-H$.

11. The acrylate of claim 1 wherein said acrylate is prepared by reacting said fluoropolyol in a solution of acrylic acid anhydride and a quaternary ammonium salt.

* * * * *